US006028138A

United States Patent [19]
Hahn et al.

[11] Patent Number: 6,028,138
[45] Date of Patent: Feb. 22, 2000

[54] PHASE CHANGE INK FORMULATION USING URETHANE ISOCYANATE-DERIVED RESINS, A POLYETHYLENE WAX AND TOUGHENING AGENT

[75] Inventors: Daniel R. Hahn, Tualatin; Clifford R. King, Salem; Donald R. Titterington, Tualatin; Jeffery H. Banning, Hillsboro; Wolfgang G. Wedler, Tualatin, all of Oreg.

[73] Assignee: Tektronix, Inc., Wilsonville, Oreg.

[21] Appl. No.: 09/023,851

[22] Filed: Feb. 13, 1998

Related U.S. Application Data

[63] Continuation-in-part of application No. 08/672,815, Jun. 28, 1996, Pat. No. 5,830,942, and application No. 09/013,410, Jan. 26, 1998.

[51] Int. Cl.[7] .......................... C09D 11/02; C09D 11/10; C09D 175/04; C08L 75/04
[52] U.S. Cl. ............................. 524/590; 523/160
[58] Field of Search ...................... 523/160, 161; 524/590; 106/31.3, 31.31, 31.32, 31.62, 31.63, 31.64

[56] References Cited

U.S. PATENT DOCUMENTS

| | | | |
|---|---|---|---|
| 2,409,712 | 10/1946 | Schweitzer | 260/453 |
| 3,012,991 | 12/1961 | Schultheis et al. | 260/75 |
| 3,384,623 | 5/1968 | Inoue et al. | 528/49 |
| 3,425,973 | 2/1969 | Shaw, Jr. | 524/590 |
| 3,653,932 | 4/1972 | Berry et al. | 106/22 |
| 3,963,679 | 6/1976 | Ullrich et al. | 260/75 |
| 3,963,710 | 6/1976 | Aufdermarsh, Jr. | 260/247.2 |
| 4,011,311 | 3/1977 | Noomen et al. | 424/65 |
| 4,080,314 | 3/1978 | Bonk et al. | 528/69 |
| 4,284,729 | 8/1981 | Cross et al. | 521/158 |
| 4,293,470 | 10/1981 | Cuscurida | 260/45.9 |
| 4,297,501 | 10/1981 | Becker et al. | 560/24 |
| 4,334,032 | 6/1982 | Patton, Jr. et al. | 521/115 |
| 4,334,052 | 6/1982 | Patton, Jr. et al. | 528/52 |
| 4,381,403 | 4/1983 | Falcone et al. | 560/24 |
| 4,390,369 | 6/1983 | Merritt et al. | 106/31 |
| 4,484,948 | 11/1984 | Merritt et al. | 106/31 |
| 4,501,915 | 2/1985 | McCoy | 560/157 |
| 4,537,960 | 8/1985 | Merger et al. | 544/86 |
| 4,574,147 | 3/1986 | Meckel | 528/64 |
| 4,665,146 | 5/1987 | Tortorello et al. | 526/304 |
| 4,684,956 | 8/1987 | Ball | 346/1.1 |
| 4,810,820 | 3/1989 | Slack et al. | 560/27 |
| 4,846,846 | 7/1989 | Rekers et al. | 8/515 |
| 4,851,045 | 7/1989 | Taniguchi | 106/31 |
| 4,889,560 | 12/1989 | Jaeger et al. | 106/27 |
| 4,889,761 | 12/1989 | Titterington et al. | 428/195 |
| 5,006,170 | 4/1991 | Schwarz et al. | 106/20 |
| 5,059,647 | 10/1991 | Kawaguchi | 524/100 |
| 5,151,120 | 9/1992 | You et al. | 106/27 |
| 5,195,430 | 3/1993 | Rise | 100/168 |
| 5,221,335 | 6/1993 | Williams et al. | 106/23 |
| 5,278,223 | 1/1994 | Gruenewaelder et al. | 524/502 |
| 5,372,852 | 12/1994 | Titterington et al. | 427/288 |
| 5,389,720 | 2/1995 | Markusch et al. | 524/839 |
| 5,389,958 | 2/1995 | Bui et al. | 347/103 |
| 5,496,879 | 3/1996 | Griebel et al. | 524/320 |
| 5,621,022 | 4/1997 | Jaeger et al. | 523/161 |
| 5,624,483 | 4/1997 | Fujioka | 106/31.29 |
| 5,817,860 | 10/1998 | Rizk et al. | 560/25 |

FOREIGN PATENT DOCUMENTS

| | | |
|---|---|---|
| 0187352 | 7/1986 | European Pat. Off. . |
| 0206286 | 12/1986 | European Pat. Off. . |
| 4205636 | 8/1993 | Germany . |
| 4205713 | 8/1993 | Germany . |
| 2294939 | 5/1996 | United Kingdom . |
| 9404619 | 3/1994 | WIPO . |
| 9414902 | 7/1994 | WIPO . |
| 9712003 | 4/1997 | WIPO . |
| 9713816 | 4/1997 | WIPO . |

OTHER PUBLICATIONS

"Polymer Chemistry—The Basic Concepts" by Paul C. Hiemenz, California State Polytechnic University, Pomona, California, p. 7.

"Technical Product Information" Luxate® Isophorone Diisocyanate, by Olin Chemicals, Olin Corporation, 2 pgs.

"Advanced Organic Chemistry" Reactions, Mechanisms, and Structure, Third Edition, by Jerry March, Professor of Chemistry, Adelphi University, 6 pgs.

*Primary Examiner*—Vasu Jagannathan
*Assistant Examiner*—Callie E. Shosho
*Attorney, Agent, or Firm*—Ralph D'Alessandro; Charles F. Moore; David G. Latwesen

[57] ABSTRACT

Urethane resins are made by reacting selected nucleophiles, such as alcohols including a hydroxyl containing toughening agent, with an isocyanate. A colored urethane resin is combined to form a phase change ink. The order of addition of the isocyanate and the different nucleophiles can tailor the distribution of di-urethane and mixed urethane/urea molecules in the final resin product. The isocyanate-derived resin materials are useful as ingredients as phase change ink carrier compositions used to make phase change ink jet inks.

19 Claims, No Drawings

6,028,138

PHASE CHANGE INK FORMULATION USING URETHANE ISOCYANATE-DERIVED RESINS, A POLYETHYLENE WAX AND TOUGHENING AGENT

CROSS-REFERENCE RELATED APPLICATIONS

This application is a continuation-in-part application of U.S. patent application Ser. No. 08/672,815 filed on Jun. 28, 1996 now issued as U.S. Pat. 5,830,942 and U.S. patent application Ser. No. 09/013,410 filed on Jan. 26, 1998 which applications are specifically incorporated herein by reference in their entirety.

BACKGROUND OF THE INVENTION

1. Field of the Invention

The present invention relates generally,to phase change inks. More particularly, the present invention relates to a phase change carrier composition containing the combination of a plurality of urethane resins, at least one amide wax, and at least one polyethylene wax. Additionally, the present invention relates to inks useful for printing applications formed by adding colorant materials to such carrier compositions. Still further, the present invention relates to processes of using these phase change ink compositions containing such phase change inks in a printing device. The phase change inks possess improved document feed capability when used to create images on paper that is used in a photocopier.

2. Description of the Relevant Art

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. patent application Ser. No. 08/381,610, filed Jan. 30, 1995, and assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks Some representative examples include U.S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT Patent Application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. and obtainer; by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene, glycol phenyl ether (PPL)); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT Application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

Recent advances have led to the creation of phase change ink carrier compositions and inks made from such carrier compositions that employ urethane resins that are reaction products of various alcohols and iscoyanates with other ingredients. However, some of such carrier compositions and the inks obtained therefrom, despite having other desirable properties, can be brittle, flaking or cracking when media on which they have been applied are handled.

There is still a need for new materials for novel and different applications of phase change carrier compositions and phase change inks containing these carrier compositions. There is also a need for relatively low viscosity resins, including non-polymeric resins, and waxes designed for phase change ink jet and other forms of phase change ink printing. Additionally, needs continue to exist for phase change inks made from urethane resins which can be used to create imaged output that can be reliably and easily be fed automatically through photocopiers and which is sufficiently durable to not easily scratch or flake off of the final receiving substrate. These needs are solved by the present invention by providing a means to tailor the properties of these resin materials for specific applications.

BRIEF SUMMARY OF THE INVENTION

It is an aspect of the present invention that urethane compounds comprising the reaction product of selected isocyanates with selected alcohols or mixtures of selected alcohols are obtained.

It is another aspect of the present invention that phase change ink compositions are made from the admixture of at least one urethane resin; at least one polyethylene wax, at least one amide wax, a toughening agent, and a phase change compatible colorant.

It is still another aspect of the present invention that colored urethane compounds comprising the reaction product of selected isocyanates with mixtures of selected alcohols or mixtures of selected alcohols and chromogen-containing nucleophiles are obtained.

It is yet another aspect of the present invention that a method for producing a layer of a phase change colored ink on the surface of a substrate by either direct or indirect printing is obtained wherein the phase change ink composition in the solid phase comprises an admixture of (a) a phase change carrier composition containing at least one isocyanate-derived resin, (b) at least one polyethylene wax, (c) at least one amide wax, (d) a toughening agent, and (e) a phase change ink compatible colorant.

It is a feature of the present invention that the at least one alcohol used to react with the isocyanate is a straight chained monohydric aliphatic alcohol of carbon chain length 20 or higher.

It is a feature of the present invention that the phase change ink carrier composition and the phase change ink obtained from such carrier composition possesses a low viscosity in the liquid phase and a low coefficient of friction against glass in the solid phase.

It is another feature of the present invention that the phase change ink carrier composition and the phase change ink obtained from such carrier composition possesses toughness and durability when applied to a final receiving substrate or media.

It is an advantage of the present invention that the isocyanate-derived resins or waxes can be design engineered to obtain desired properties for specific printing platforms and architectures.

It is another advantage of the present invention that the phase change ink carrier composition and the phase change ink obtained from such carrier composition do not easily scratch or flake off the final receiving substrate or media when imaged thereon.

It is another advantage of the present invention that the isocyanate-derived resins or waxes are very pure, being free of salts and other insoluble contaminants.

These and other aspects, features and advantages are obtained by the use of reaction products of selected isocyanates with selected alcohols and a toughening agent, mixed with amide and polyethylene waxes in phase change inks to produce durable phase change inks having low coefficients of friction that may be employed in direct or indirect printing applications.

DESCRIPTION OF THE PREFERRED EMBODIMENTS

The term "nucleophile" in the present specification and claims is used as defined on page 179 of "Advanced Organic Chemistry", 3rd Edition by Jerry March, ©1985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, ©1984 by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The term "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

The term "urethane resin" or "urethane isocyanate-derived resin" as used in the present specification and claims is defined as any resin that is a urethane that is the product of the reaction of an isocycanate and an alcohol.

The term "mixed urethane/urea resin" or "urethane/urea isocyanate-derived resin" as used in the present specification and claims is defined as any resin that is a mixed urethane/urea that is the product of the reaction of an isocycanate, an alcohol and an amine.

Any suitable reaction condition for making urethane or mixed urethane/urea compounds by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diusocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate® IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s of about −30° C. to about 100° C. The isocyanate-derived waxes from these reactions are generally opaque waxy solids having sharp melting points from about 50° C. to about 130° C., and viscosities of about 1 cPs to about 25 cPs at 140° C. The isocyanate-derived resins and waxes display properties such that the higher the $T_g$ and the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 3 in the aforementioned incorporated by reference U.S. application Ser. No. 08/672,815. Varying one or more of the readily available commodity chemicals used as chemical precursors will permit custom-tailoring of the properties of the isocyanate-derived resin and wax materials.

Preferred alcohols to react with difunctional and higher isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

The most preferred alcohol to use to react with an isocyanate to create an urethane resin that can be incorporated into a low coefficient of friction phase change ink is a straight chained monohydric aliphatic alcohol of carbon chain length 20 or higher.

Preferred amines to react with difunctional and higher isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t- and the like) hexyl amine, (n-, iso-,t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.; 3,3'-diamino-N-methyl-dipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-)propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanol.

Preferred amines to react with monofunctional isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like) octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylaminopropylamine; 4,7,10-trioxa- 1,13-tridecanediamine; diethylene triamine; 3,3-diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally amides or other nucleophile containing compounds can be reacted with the isocyanates (mono, di, and the like). Some examples include: urea, oleamide, stearamide, or the like.

Preferred precursors to the isocyanate-derived resins and waxes of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}$MDI); tetra-methyl xylene diisocyanate (TMXDI); hexamethylene-1,6-diisocyanate (HDI); hexamethylene-1, 6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change inks of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change carrier composition and the inks made therefrom which collectively comprise the invention can contain a combination urethane resins, and/or urethane/urea resins, along with a polyethylene wax ingredient. Additionally a mono-amide ingredient can be employed in making the inks. These ingredients can be supplemented with (one or more) optional ingredients to prepare commercial phase change carrier compositions and inks. The urethane resins and the mixed urethane/urea resin materials of the current invention are tailored to have the desirable properties mentioned above when used in the carrier composition of the inks of the present invention by varying one or more of the readily available commodity chemical precursors.

The preferred chromogen-containing nucleophilic molecules include dyes such as those disclosed in U.S. Pat. Nos. 3,994,835 and 4,132,840, assigned to Bayer, and U.S. Pat. Nos. 4,284,729; 4,507,407; 4,751,254; 4,846,846; 4,912,203; 5,270,363 and 5,290,921 assigned to Milliken Research Corporation. Also suitable may be any Color Index (C.I.) Solvent Dyes, Disperse Dyes, modified Acid and Direct Dyes, Basic Dyes, Sulphur Dyes or Vat Dyes that contain an alcohol, amine, or other nucleophilic functional group that is capable of reacting with an isocyanate. The more preferred chromogen-containing nucleophilic molecules contain at least one alcohol functional group. Most preferably this alcohol functional group is terminal to an alkylene oxide polymeric chain, such as a butylene oxide, styrene oxide, polyethylene oxide, polypropylene oxide, or a polyethylene/polypropylene oxide polymeric chain.

The phase change carrier compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. Pat. No. 5,621,022; and/or pigments. Alternately, the phase change carrier compositions of the current invention may employ colored urethane resins of urethane/urea resins or other isocyanate-derived colored resins as described in co-pending U.S. patent application Ser. No. 08/672,617 filed Jun. 28, 1996 and assigned to the assignee of the present invention now U.S. Pat. No. 5,780,528, (issued Jul. 14, 1998) to produce a phase change ink. Where colored urethane resins are employed, they may comprise all or a portion of the colorant material.

The mono-amide ingredient of the phase change carrier compositions and the inks made therefrom of the present invention typically comprises either a primary or secondary mono-amide, but is preferably a secondary mono-amide. Of the primary mono-amides, stearamide, such as KEMAMIDE S, manufactured by Witco Chemical Company, can be employed herein. As for the secondary mono-amides, behenyl benenamide (KEMAMIDE EX-666), and stearyl stearamide (KEMAMIDE S-180), both manufactured by Witco Chemical Company, are extremely useful mono-amides. However, stearyl stearamide (KEMAMIDE S-180) is the mono-amide of choice in producing the phase change ink compositions of the present invention.

Another critical ingredient of the phase change carrier compositions and the inks made therefrom of the present invention is at least one polyethylene wax. Preferably, the polyethylene wax has a molecular weight of about 500 to about 5,000; more preferably, of about 700 to about 2,000; and, most preferably, of about 800 to 1,200. Preferred polyethylene waxes are Polywax 850, Polywax 1000 or Polywax 2000, all available from Petrolite.

The other critical ingredient of the phase change carrier compositions and the inks made therefrom of the present invention is at least one toughening agent. The toughening agent is added as a reactant to form the urethane resin reaction product and is characterized as preferably being a hydroxyl containing compound. The toughening agent is one selected from the group consisting of a hydroxyl containing polycarbonate, a straight chained alcohol ethoxylate, a Guerbet-type branched alcohol, a polyethylene butylene mono-alcohol and mixtures thereof.

Preferably, the total amount of urethane resin or resins in the phase change carrier composition and the inks made therefrom will comprise about 10% to about 60%, more preferably, about 15–50% and most preferably, about 20–50% by weight of the carrier composition. Preferably, when employed, the total amount of mixed urethane/urea resin or resins in the phase change carrier composition will likewise comprise about 5% to about 30%, more preferably about 10–25% and most preferably, about 12–20%, by weight of the carrier composition. Preferably, the total amount of mono-amide wax and polyethylene wax combined will comprise about 40% to about 70%, more preferably, about 45–60% and most preferably about 48–57% by weight of the carrier composition.

The ratio of mono-amide wax to the polyethylene wax is preferably from about 2:1 to 1:2, by weight.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. A preferred mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The isocyanate-derived resins and/or isocyanate-derived waxes of the present invention can replace one or more of the ingredients in the above phase change ink carrier composition or the inks of the present invention can have all of the above ingredients replaced by the isocyanate-derived resins and/or waxes of the present invention. The advantages of inks formulated with isocyanate-derived resins and/or isocyanate-derived waxes over the prior art phase change inks are:

(1) The urethane resins and mixed urethane/urea resins of this invention are very pure, being free of salts and other insoluble contaminants. This makes the inks made from these materials easy to filter and provides for high reliability in ink jet printing devices. This is a major advantage.

(2) The urethane resins and mixed urethane/urea resins of this invention are specifically tailored to give certain physical properties that optimize the performance of the inks of this invention in ink jet printing devices and on the output substrate. These desirable ink properties include melting point, viscosity, transparency and the dynamic mechanical properties referenced in the aforementioned U.S. Pat. No. 5,389,958.

(3) The urethane resins and mixed urethane/urea resin of this invention are used in certain combinations with polyethylene wax and mono-amide ingredients to give ink compositions that display an improved yield stress versus temperature curve over prior art ink compositions. This enables ink droplets to be spread and fused at elevated temperatures during the fusing and transfer steps in an indirect printing process, but at a lower pressure than was possible with prior art inks, as well as reducing the coefficient of friction of ink.

(4) The mixtures of urethane resins, mixed urethane/urea resins, monoamide waxes and polyethylene waxes described in this patent provide inks with a low coefficient of friction in the solid phase.

(5) The phase change urethane resins of the present invention and the phase change inks made therefrom possess increased resistance to scratching and cracking, thereby possesing increased durablility.

Many other patents describe other materials for use in phase change ink jet inks. Some representative examples include U.S. Pat. Nos. 3,653,932; 4,390,369; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, polyethylene waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the isocyanate-derived materials of this invention could be used in inks made from many different combinations of these materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the isocyanate-derived materials of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or print head;

(3) raising the operating temperature of the application means or print head to a level whereby a liquid phase, phase change colored ink composition is formed;

(4) providing a substrate in proximity to the application means;

(5) applying a predetermined pattern of the liquid phase, phase change colored ink composition to at least one surface of the substrate; and (6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or a print head;

(3) raising the operating temperature of the application means or print head to a level whereby a liquid phase, phase change colored ink composition is formed;

(4) providing an intermediate transfer surface in proximity to the application means;

(5) applying a predetermined pattern of the liquid phase, phase change colored ink composition to the intermediate transfer surface;

(6) lowering the temperature of the applied ink composition to form a solid phase, phase change ink pattern on the intermediate transfer surface at a second, intermediate temperature;

(7) transferring said phase change ink composition from the intermediate transfer surface to a final substrate; and (8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative and any of the primary colorants (cyan, yellow, magenta and black) used in subtractive color printing could be employed in each instance.

EXAMPLE 1

The Reaction of C-32 Linear Alcohol and Isophorone Diisocyanate

To a 1000 ml four-neck resin kettle equipped with a Trubore stirrer, $N_2$ atmosphere, addition funnel (200 ml), and thermocouple-temperature controller was added about 900.0 grams (1.714 moles) of a C-32 linear alcohol[1] and about 169.1 grams (0.762 moles) of isophorone diisocyanate[2] to the addition funnel. The alcohol was heated to 130° C. and agitation begun. The isophorone diisocyanate was added in approximately 13 minutes. About 0.22 grams of dibutyltindilaurate[3] was added and the reaction mixture heated to about 145° C. After 2 hours at 145° an FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final urethane resin product was then poured into aluminum molds and allowed to cool and harden. This final product was a clear solid resin at room temperature characterized by the following physical properties: viscosity of about 12.5 cPs as measured by a Ferranti-Shirley cone-plate viscometer at about 140° C. A $T_g$ for this material was not observed as measured by Differential Scanning Calorimetry using a DuPont 2100 calorimeter at a scan rate of 20° C./minute.

[1]UNELIN 425—C-32 linear alcohol available from Baker Petrolite of Tulsa, Okla.
[2]Desmodur I—Isophorone diisocyanate available from Bayer Corp. of Pittsburg, Pa.
[3]FASCAT 4202—dibutyltindilaurate available from Elf Atochem North America inc. of Philadelphia, Pa.

EXAMPLE 2

The Reaction Product of C-40 Linear Alcohol and Yellow Reactive Colorant with Isophorone Diiocyanate To a 1000 ml four-neck resin kettle equipped with a Trubore stirrer, $N_2$ atmosphere, and thermocouple-temperature controller was added about 20.5 grams (0.056 equiv.) of a yellow polymeric colorant[1] and about 25.0 grams (0.225 equiv.) of isophorone diisocyanate[2]. This mixture was agitated without heating under nitrogen. After 1 hour the temperature was raised to about 50° C. and stirring continued. After 45 minutes, about 0.22 grams of dibutyltindilaurate[6] was added and the reaction mixture was heated to about 60° C. After 1 hour at 60° C., about 114 grams (0.169 equiv.) of a C-40 linear alcohol[4] was added and the reaction mixture was heated to about 135° C. After about 1 hour an FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a yellow solid resin at room temperature characterized by the following physical properties: viscosity of about 45 cPs as measured by a Ferranti-Shirley cone-plate viscometer at about 140° C. The Tg and spectral strength of this material were not measured.

[1]Experimental Yellow (9770-3) available from Milliken and Company of Spartanburg, S.C.
[2]Desmodur I—Isophorone diisocyanate available from Bayer Corp. of Pittsburg, Pa.
[3]FASCAT 4202—dibutyltindilaurate available from Elf Atochem North America inc. of Philadelphia, Pa.
[4]UNILIN 550—C-40 linear alcohol available from Baker Petrolite of Tulsa, Okla.

EXAMPLE 3

The Reaction Product of C-50 Linear Alcohol and Yellow Reactive Colorant with Isophorone Diisocyanate To a 1000 ml four-neck resin kettle equipped with a Trubore stirrer, $N_2$ atmosphere, and thermocouple-temperature controller was added about 24.6 grams (0.067 equiv.) of a yellow polymeric colorant[1] and about 25.0 grams (0.225 equiv.) of isophorone diisocyanate[2]. This mixture was agitated without heating under nitrogen. After 30 minutes, about 0.22 grams of dibutyltindilaurate[6] was added and the mixture was agitated without heating under nitrogen. After 30 minutes the temperature was raised to about 50° C. and stirring continued. After 30 minutes the reaction mixture was heated to about 100° C. After 30 minutes, about 136.1 grams (0.158 equiv.) of a C-50 linear alcohol[1] was added and the reaction mixture was heated to about 135° C. After about 1 hour a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a yellow solid resin at room temperature characterized by the following physical properties: viscosity of about 158 cPs as measured by a Ferranti-Shirley cone-plate viscometer at about 140° C. The Tg and spectral strength of this material were not measured.

[1]Experimental Yellow (9770-3) available from Milliken and Company of Spartanburg, S.C.
[2]Desmodur I—Isophorone diisocyanate available from Bayer Corp. of Pittsburg, Pa.
[3]FASCAT 4202—dibutyltindilaurate available from Elf Atochem North America inc. of Philadelphia, Pa.
4UNLJIN 700—C-50 linear alcohol available from Baker Petrolite of Tulsa, Okla.

EXAMPLE 4

The Reaction Product of C-40 Linear Alcohol and Isophorone Diisocyanate

To a 1000 ml four-neck resin kettle equipped with a Trubore stirrer, $N_2$ atmosphere, addition funnel (200 ml), and thermocouple-temperature controller was added about 610 grams (0.904 moles) of a C-40 linear alcohol[1] and about 100.0 grams (0.450 moles) of isophorone diisocyanate[2] to the addition funnel. The alcohol mixture was heated to 100° C. and agitation begun. The isophorone diisocyanate was added in approximately 5 minutes. About 0.22 grams of dibutyltindilaurate[3] was added and the reaction mixture heated to about 135° C. After 2 hours, an FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final urethane resin product was then poured into aluminum molds and allowed to cool and harden. This final product was a clear solid resin/wax at room temperature characterized by the following physical properties: viscosity of about 21 cPs as measured by a Ferranti-Shirley cone-plate viscometer at about 140° C. A $T_g$ for this material was not observed as measured by Differential Scanning Calorimetry using a DuPont 2100 calorimeter at a scan rate of 20° C./minute.

[1]UNILIN 550—C-40 linear alcohol available from Baker Petrolite of Tulsa, Okla.
[2]Desmodur I—Isophorone diisocyanate available from Bayer Corp. of Pittsburg, Pa.
[3]FASCAT 4202—dibutyltindilaurate available from Elf Atochem North America inc. of Philadelphia, Pa.

EXAMPLE 5

The Reaction Product of Hydroabietyl Alcohol, Octylphenol Ethoxylate and C-30 Linear Alcohol with Isophorone Diisocyanate To a 1000 ml four-neck resin kettle equipped with a Trubore stirrer, $N_2$ atmosphere, addition funnel (200 ml), and thermocouple-temperature controller was added about 250.0 grams of stearyl stearamide[1], about 144.0 grams (0.560 moles) of octylphenol ethoxylate[2], about 84.0 grams (0.234 moles) of hydroabietyl alcohol[3], about 91.0 grams (0.173 moles) of C-32 linear alcohol[4] and about 111.5 grams (0.502 moles) of isophorone diisocyanate[5] to the addition funnel. This mixture was heated to 125° C. and agitation begun when all components were molten (at approx. 100° C.). The isophorone diisocyanate was added in approximately 2 minutes. About 0.22 grams of dibutyltindilaurate[6] was added and the reaction mixture heated to about 150° C. After 2 hours at 150° C., about 15.0 grams (0.058 moles) of octylphenol ethoxylate[2], about 15.5 grams (0.044 moles) of hydroabietyl alcohol[3], about 15.0 grams (0.029 moles) of C-32 linear alcohol[4] and about 0.05 grams of dibutyltindilaurate[6] were added and the reaction mixture heated at about 150° C. for 1 hour. A FT-IR of the reaction product was run to insure all of the NCO functionality was consumed. The absence (disappearance) of a peak at about 2285 $cm^1$ (NCO) and the appearance (or increase in magnitude) of peaks at about 1740 to about 1680 $cm^{-1}$ and about 1540 to about 1530 $cm^{31\ 1}$ corresponding to urethane frequencies was used to confirm this. The final mixed urethane resin/wax product was then poured into aluminum molds and allowed to cool and harden. This final product was a clear solid resin/wax at room temperature characterized by the following physical properties: viscosity of about 13.01 cPs as measured by a Ferranti-Shirley cone-plate viscometer at about 140° C. The $T_g$ of this material was not measured.

[1]S-180—stearyl stearamide available from Witco Corp. Greenwich, Conn.
[2]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[3]Abitol E—Hydroabietyl alcohol available from Hercules Inc. of Wilmington, Del.
[4]UNILIN 425—C-32 linear alcohol available from Baker Petrolite of Tulsa, Okla.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 6

The Reaction Product of Hydroabietyl Alcohol, Octylphenol Ethoxylate, C-32 Linear Alcohol, and Yellow Reactive Colorant with Isophorone Diisocyanate To a 1000 ml four-neck resin kettle equipped with a Trubore stirrer, $N_2$ atmosphere, addition funnel (200 ml), and thermocouple-temperature controller was added about 250.0 grams of stearyl stearamide[1], about 131.0 grams (0.509 equiv.) of octylphenol ethoxylate[2], about 65.0 grams (0.184 equiv.) of hydroabietyl alcohol[3], about 71.3 grams (0.136 equiv.) of C-32 linear alcohol[4] and about 106.0 grams (0.955 equiv.) of isophorone diisocyanate[5] to the addition funnel. This mixture was heated to 145° C. and agitation begun when all components were molten (at approx. 100° C.). The isophorone diisocyanate was added in approximately 2 minutes. About 0.22 grams of dibutyltindilaurate[6] was added and the reaction mixture was maintained at about 145° C. After 1 hour at 145° C., about 40.8 grams (0.0591 equiv.) of a yellow polymeric colorant corresponding to Colorant A from Table I of U.S. Pat. No. 5,231,135 and about 0.05 grams of dibutyltindilaurate[6] were added and the reaction mixture was maintained at about 145° C. After I hour, about 15.0 grams (0.058 equiv.) of octylphenol ethoxylate[2], about 15.0 grams (0.042 equiv.) of hydroabietyl alcohol[3], about 15.0 grams (0.029 equiv.) of C-32 linear alcohol[4] and about 0.05 grams of dibutyltindilaurate[6] were added and the reaction mixture was maintained at about 150° C. for 1 hour. A FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a yellow solid resin at room temperature characterized by the following physical properties: viscosity of about 15 cPs as measured by a Ferranti-Shirley cone-plate viscometer at about 140° C. The $T_g$ and spectral strength of this material were not measured.

[1]S-180—stearyl stearamide available from Witco Corp. Greenwich, Conn.
[2]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[3]Abitol E—Hydroabietyl alcohol available from Hercules Inc. of Wilmington, Del.
[4]UNILIN 425—C-32 linear alcohol available from Baker Petrolite of Tulsa, Okla.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 7

The Reaction Product of Hydroabietyl Alcohol, Octylphenol Ethoxylate, C-32 Linear Alcohol, and Cyan Reactive Colorant with Isophorone Diisocyanate To a 1000 ml four-neck resin kettle equipped with a Trubore stirrer, $N_2$ atmosphere, addition funnel (200 ml), and thermocouple-temperature controller was added about 200.0 grams of stearyl stearamide[1], about 104.8 grams (0.408 equiv.) of octylphenol ethoxylate[2], about 54.6 grams (0.154 equiv.) of hydroabietyl alcohol[3], about 57.6 grams (0.110 equiv.) of C-32 linear alcohol[4] and about 87.4 grams (0.787 equiv.) of isophorone diisocyanate[5] to the addition funnel. This mixture was heated to 125° C. and agitation begun when all components were molten (at approx. 100° C.) under nitrogen. The isophorone diisocyanate was added in approximately 2 minutes. About 0.22 grams of dibutyltindilaurate[6] was added and the reaction mixture heated at about 145° C. After 1 hour about 11.5 grams (0.0226 equiv.) of a cyan polymeric colorant[7] and about 0.05 grams of dibutyltindilaurate[6] were added and the reaction mixture heated at about 145° C. After 1 hour about 15.0 grams (0.058 equiv.) of octylphenol ethoxylate[2], about 15.5 grams (0.044 equiv.) of hydroabietyl alcohol[3], about 15.0 grams (0.029 equiv.) of C-32 linear alcohol[4] and about 0.05 grams of dibutyltindilaurate[6] were added and the reaction mixture heated at about 145° C. for 1 hour. A FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies were used to confirm this. The final mixed urethane resin product was then poured into aluminum molds and allowed to cool and harden. This final product was a cyan solid resin at room temperature characterized by the following physical properties: viscosity of about 15.6 cPs as measured by a Ferranti-Shirley cone-plate viscometer at about 140° C. The $T_g$ and spectral of this material were not measured.

¹S-180—stearyl stearamide available from Witco Corp. Greenwich, Conn.
²IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
³Abitol E—Hydroabietyl alcohol available from Hercules Inc. of Wilmington, Del.
⁴UNILIN 425—C-32 linear alcohol available from Baker Petrolite of Tulsa, Okla.
⁵Desmodur I—Isophorone diisocyanate available from Bayer Corp. of Pittsburg, Pa.
⁶FASCAT 4202—dibutyltindilaurate available from Elf Atochem North America inc. of Philadelphia, Pa.
⁷Experimental Blue III (9495-28) available from Milliken and Company of Spartanburg, S.C.

EXAMPLE 8

The Reaction Product of Hydroabietyl Alcohol, Octylphenol Ethoxylate, C-32 Linear Alcohol, Yellow Reactive Colorant, and Polycarbonate Polyol with Isophorone Diisocyanate To a 1000 ml four-neck resin kettle equipped with a Trubore stirrer, $N_2$ atmosphere, addition funnel (200 ml), and thermocouple-temperature controller was added about 34.7 grams (0.186 equiv.) of octylphenol ethoxylate[1], about 47.8 grams (0.135 equiv.) of hydroabietyl alcohol[2], about 57.0 grams (0.109 equiv.) of C-32 linear alcohol[3] and about 50.0 grams (0.450 equiv.) of isophorone diisocyanate[4] to the addition funnel. This mixture was heated to 125° C. and agitation begun when all components were molten (at approx. 100° C.). The isophorone diisocyanate was added in approximately 2 minutes. About 0.15 grams of dibutyltindilaurate[5] was added and the reaction mixture heated to about 160° C. After 1 hour at 160° C., about 22.4 grams (0.023 equiv.) of polycarbonate polyol[6] and about 0.05 grams of dibutyltindilaurate[6] were added and the reaction mixture was heated to about 170° C. After 1 hour at 170° C., about 15.7 grams (0.023 equiv.) of a yellow polymeric colorant corresponding to Colorant A from Table I of U.S. Pat. No. 5,231,135 and about 0.05 grams of dibutyltindilaurate[6] were added and the reaction mixture was heated at about 170° C. After 1 hour at 170° C., about 17.0 grams (0.032 equiv.) C-32 linear alcohol[3] was added and the reaction mixture was heated at about 170° C. After 1 hour at 170° C. a FT-IR of the reaction product was run to insure all of the NCO functionality was consumed. The absence (disappearance) of a peak at about 2285 cm⁻¹ (NCO) and the appearance (or increase in magnitude) of peaks at about 1740 to about 1680 cm⁻¹ and about 1540 to about 1530 cm⁻¹ corresponding to urethane frequencies was used to confirm this. The final mixed urethane resin product was then poured into aluminum molds and allowed to cool and harden. This final product was a yellow solid resin at room temperature characterized by the following physical properties: viscosity of about 429 cPs as measured by a Ferranti-Shirley cone-plate viscometer at about 140° C. The $T_g$ and spectral strength of this material were not measured.

¹IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
²Abitol E—Hydroabietyl alcohol available from Hercules Inc. of Wilmington, Del.
3UNILIN 425—C-32 linear alcohol available from Baker Petrolite of Tulsa, Okla.
⁴Desmodur I—Isophorone diisocyanate available from Bayer Corp. of Pittsburg, Pa.
⁵FASCAT 4202—dibutyltindilaurate available from Elf Atochem North America inc. of Philadelphia, Pa.
⁶PC-1122—polycarbonate polyol available from STAHL USA of Peabody, Mass.

EXAMPLE 9

The Reaction Product of Hydroabietyl Alcohol, Octylphenol Ethoxylate, C-32 Linear Alcohol, Cyan Reactive Colorant, and Polycarbonate Polyol with Isophorone Diisocyanate To a 1000 ml four-neck resin kettle equipped with a Trubore stirrer, $N_2$ atmosphere, addition funnel (200 ml), and thermocouple-temperature controller was added about 34.7 grams (0.186 equiv.) of octylphenol ethoxylate[1], about 47.8 grams (0.135 equiv.) of hydroabietyl alcohol[2], about 57.0 grams (0.109 equiv.) of C-32 linear alcohol[3] and about 50.0 grams (0.450 equiv.) of isophorone diisocyanate[4] to the addition funnel. This mixture was heated to 125° C. and agitation begun when all components were molten (at approx. 100° C.). The isophorone diisocyanate was added in approximately 2 minutes. About 0.15 grams of dibutyltindilaurate[5] was added and the reaction mixture heated to about 160° C. After 1 hour at 160° C., about 22.4 grams (0.023 equiv.) of polycarbonate polyol[6] and about 0.05 grams of dibutyltindilaurate[6] were added and the reaction mixture was heated to about 170° C. After 1 hour at 170° C., about 11.5 grams (0.23 equiv.) of a cyan polymeric colorant[7] and about 0.05 grams of dibutyltindilaurate[6] were added and the reaction mixture was heated at about 170° C. After 1 hour at 170° C., about 17.0 grams (0.032 equiv.) C-32 linear alcohol[3] was added and the reaction mixture was heated at about 170° C. After 1 hour at 170° C. a FT-IR of the reaction product was run to insure all of the NCO functionality was consumed. The absence (disappearance) of a peak at about 2285 cm⁻¹ (NCO) and the appearance (or increase in magnitude) of peaks at about 1740 to about 1680 cm⁻¹ and about 1540 to about 1530 cm⁻¹ corresponding to urethane frequencies was used to confirm this. The final mixed urethane resin product was then poured into aluminum molds and allowed to cool and harden. This final product was a cyan solid resin at room temperature characterized by the following physical properties: viscosity of about 11.9 cPs as measured by a Ferranti- Shirley cone-plate viscometer at about 140° C. The $T_g$ and spectral strength of this material were not measured.

¹IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
²Abitol E—Hydroabietyl alcohol available from Hercules Inc. of Wilmington, Del.
3UNILIN 425—C-32 linear alcohol available from Baker Petrolite of Tulsa, Okla.
⁴Desmodur I—Isophorone diisocyanate available from Bayer Corp. of Pittsburg, Pa.
⁵FASCAT 4202—dibutyltindilaurate available from Elf Atochem North America inc. of Philadelphia, Pa.
⁶PC-1122—polycarbonate polyol available from STAHL USA of Peabody, Mass.
⁷Experimental Blue III (9495-28) available from Milliken and Company of Spartanburg, S.C.

EXAMPLE 10

The Reaction Product of Hydroabietyl Alcohol, Octylphenol Ethoxylate, C-32 Linear Alcohol, and 0.1 Equivalents Polycarbonate Polyol with Isophorone Diisocmanate To a 3000 ml four-neck resin kettle equipped with a Trubore stirrer, $N_2$ atmosphere, addition funnel, and thermocouple-temperature controller was added about 294.0 grams (1.140 moles) of octylphenol ethoxylate[1], about 400.0 grams (1.140 moles) of hydroabietyl alcohol[2], about 479.0 grams (0.912 moles) of C-32 linear alcohol[3] and about 400.0 grams (1.80 moles) of isophorone diisocyanate[4] to the addition funnel. This mixture was heated to 125° C. and agitation begun when all components were molten (at approx. 100° C.). The isophorone diisocyanate was added in approximately 10 minutes. About 1.2 grams of dibutyltindilaurate[5] was added and the reaction mixture heated to about 150° C. After 1 hour, about 179.0 grams (0.090 moles) of polycarbonate polyol[6] and about 0.10 grams of dibutyltindilaurate[6] were added and the reaction mixture was heated to about 170° C. After 1 hour at 170° C., about 133.0 grams (0.253 moles) of a C-32 linear alcohol[3] was added and the reaction mixture was heated at about 170° C. After 1 hour at 170° C. a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a colorless solid resin at room temperature characterized by the following physical properties: viscosity of about 38.4 cPs as measured by a Ferranti-Shirley cone-plate viscometer at about 140° C., and a Tg of about 18° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del. 3UNILIN 425—C-32 linear alcohol available from Baker Petrolite of Tulsa, Okla.
[4]Desmodur I—Isophorone diisocyanate available from Bayer Corp. of Pittsburg, Pa.
[5]FASCAT 4202—dibutyltindilaurate available from Elf Atochem North America inc. of Philadelphia, Pa.
[6]PC-1122—polycarbonate polyol available from STAHL USA of Peabody, Mass.

EXAMPLE 11

The Reaction Product of Hydroabietyl Alcohol, Octylphenol Ethoxylate, C-32 Linear Alcohol, and 0.2 Equivalents Polycarbonate Polyol with Isophorone Diisocyanate To a 1000 ml four-neck resin kettle equipped with a Trubore stirrer, N$_2$ atmosphere, addition funnel, and thermocouple-temperature controller was added about 69.5 grams (0.270 moles) of octylphenol ethoxylate[1], about 95.7 grams (0.270 moles) of hydroabietyl alcohol[2], about 130.0 grams (0.248 moles) of C-32 linear alcohol[3] and about 100.0 grams (0.450 moles) of isophorone diisocyanate[4] to the addition funnel. This mixture was heated to 125° C. and agitation begun when all components were molten (at approx. 100° C.). The isophorone diisocyanate was added in approximately 3 minutes. About 0.22 grams of dibutyltindilaurate[5] was added and the reaction mixture heated to about 150° C. After 1 hour, about 89.6 grams (0.045 moles) of polycarbonate polyol[6] and about 0.10 grams of dibutyltindilaurate[6] were added and the reaction mixture was heated to about 160° C. After 1 hour, about 15.0 grams (0.029 moles) of a C-32 linear alcohol[3] was added and the reaction mixture was heated at about 160° C. After 1 hour, a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a colorless solid resin at room temperature characterized by the following physical properties: viscosity of about 50 cPs as measured by a Ferranti-Shirley cone-plate viscometer at about 140° C., and a Tg of about 14° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]Desmodur I—Isophorone diisocyanate available from Bayer Corp. of Pittsburg, Pa.
[5]FASCAT 4202—dibutyltindilaurate available from Elf Atochem North America inc. of Philadelphia, Pa.
[6]PC-1122—polycarbonate polyol available from STAHL USA of Peabody, Mass.

EXAMPLE 12

The Reaction Product of Hydroabietyl Alcohol, Octylphenol Ethoxylate, C-32 Linear Alcohol, and 0.3 Equivalents Polycarbonate Polyol with Isophorone Diisocyanate To a 140 ml beaker equipped with teflon coated magnetic stir bar and placed in a silicone oil bath on a stirring hot plate was added about 6.6 grams (0.0257 moles) of octylphenol ethoxylate[1], about 9.0 grams (0.0254 equiv.) of hydroabietyl alcohol[2], and about 12.0 grams (0.0229 moles) of C-32 linear alcohol[3]. This mixture was heated to 120° C. and agitation begun when all components were molten (at approx. 100° C.). About 10.0 grams (0.045 moles) of isophorone diisocyanate[4] and about 0.05 grams of dibutyltindilaurate[5] were added and the reaction mixture heated to about 150° C. After 2 hours about 13.4 grams (0.007 moles) of polycarbonate polyol[6] and about 0.05 grams of dibutyltindilaurate[5] were added and the reaction mixture heated to about 170° C. After about 2 hours about 1.4 grams (0.0027 moles) of C-32 linear alcohol[3] a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 56.6 cPs as measured by a Ferranti-Shirley cone-plate viscometer at about 140° C., and a T$_g$ of about 10.9° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
3UNILIN 425—C-32 linear alcohol available from Baker Petrolite of Tulsa, Okla.
[4]Desmodur I—Isophorone diisocyanate available from Bayer Corp. of Pittsburg, Pa.
[5]FASCAT 4202—dibutyltindilaurate available from Elf Atochem North America inc. of Philadelphia, Pa.
[6]PC-1122—polycarbonate polyol available from STAHL USA of Peabody, Mass.

EXAMPLE 13

The Reaction Product of Hydroabietyl Alcohol, Octylphenol Ethoxylate, C-32 Linear Alcohol, and 0.4 Equivalents Polycarbonate Polyol with Isophorone Diisocyanate To a 140 ml beaker equipped with teflon coated magnetic stir bar and placed in a silicone oil bath on a stirring hot plate was added about 6.2 grams (0.0241 moles) of octylphenol ethoxylate[1], about 8.5 grams (0.0240 equiv.) of hydroabietyl alcohol[2], and about 11.4 grams (0.0217 moles) of C-32 linear alcohol[3]. This mixture was heated to 120° C. and agitation begun when all components were molten (at approx. 100° C.). About 10.0 grams (0.045 moles) of isophorone diisocyanate[4] and about 0.05 grams of dibutyltindilaurate[5] were added and the reaction mixture heated to about 150° C. After 2 hours about 17.9 grams (0.009 moles) of polycarbonate polyol[6] and about 0.05 grams of dibutyltindilaurate[5] were added and the reaction mixture heated to about 170° C. After about 2 hours about 1.3 grams (0.0025 moles) of C-32 linear alcohol[3] a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 96.4 cPs as measured by a Ferranti-Shirley cone-plate viscometer at about 140° C., and a $T_g$ of about 3.1° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]Desmodur I—Isophorone diisocyanate available from Bayer Corp. of Pittsburg, Pa.
[5]FASCAT 4202—dibutyltindilaurate available from Elf Atochem North America inc. of Philadelphia, Pa.
[6]PC-1122—polycarbonate polyol available from STAHL USA of Peabody, Mass.

EXAMPLE 14

Reaction Product of Hydroabietyl Alcohol, Octylphenol Ethoxylate, C-32 Linear Alcohol, Yellow Reactant Colorant, C-50 Linear Alcohol Ethoxylate and Isophorone Diisocyanate To a 1000 ml four-neck resin kettle equipped with a Trubore stirrer, $N_2$ atmosphere, addition funnel (200 ml), and thermocouple-temperature controller was added about 32.8 grams (0.128 equiv.) of octylphenol ethoxylate1, about 46.2 grams (0.128 equiv.) of hydroabietyl alcohol[2], about 67.0 grams (0.128 equiv.) of C-32 linear alcohol[3], about 76.6 grams (0.045 equiv.) of C-50 linear alcohol ethoxylate[4], about 15.7 grams (0.023 equiv.) of a yellow polymeric colorant corresponding to Colorant A from Table I of U.S. Pat. No. 5,231,135, and about 50.0 grams (0.450 equiv.) of isophorone diisocyanate[5] to the addition funnel. This mixture was heated to 120° C. and agitation begun when all components were molten (at approx. 100° C.). The isophorone diisocyanate was added in approximately 2 minutes. About 0.22 grams of dibutyltindilaurate[6] was added and the reaction mixture heated to about 150° C. After 2 hours at 150° C., about 4.0 grams (0.008 equiv.) of C-32 linear alcohol[1] was added and the reaction mixture heated at about 150° C. for 1 hour. A FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a yellow solid resin at room temperature characterized by the following physical properties: viscosity of about 340 cPs as measured by a Ferranti-Shirley cone-plate viscometer at about 140° C. The Tg and spectral strength of this material were not measured.

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
3UNILIN 425—C-32 linear alcohol available from Baker Petrolite of Tulsa, Okla.
[4]UNITHOX 750—C-50 linear alcohol ethoxylate available from Baker Petrolite of Tulsa, Okla.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 15

The Reactant Product of Hydroabietic Alcohol, Octylphenol Ethoxylate, C-32 Linear Alcohol, C-50 Linear Alcohol Ethoxylate, Cyan Reactive Colorant, and Isophorone Diisocyanate To a 1000 ml four-neck resin kettle equipped with a Trubore stirrer, $N_2$ atmosphere, addition funnel (200 ml), and thermocouple-temperature controller was added about 32.8 grams (0.128 equiv.) of octylphenol ethoxylate[1], about 46.2 grams (0.128 equiv.) of hydroabietyl alcohol[2], about 67.0 grams (0.128 equiv.) of C-32 linear alcohol[3], about 76.6 grams (0.045 equiv.) of C-50 linear alcohol ethoxylate[4], and about 50.0 grams (0.450 equiv.) of isophorone diisocyanate[5] to the addition funnel. This mixture was heated to 120° C. and agitation begun when all components were molten (at approx. 100° C.). The isophorone diisocyanate was added in approximately 2 minutes. About 0.22 grams of dibutyltindilaurate[6] was added and the reaction mixture heated to about 150° C. After 2 hours at 150° C., about 11.5 grams (0.023 equiv.) of a cyan polymeric colorant[7] was added and the reaction mixture heated at about 150° C. After 1 hours at 150° C., about 4.0 grams (0.008 equiv.) of C-32 linear alcohol[3] was added and the reaction mixture heated at about 150° C. for 1 hour. A FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a cyan solid resin at room temperature characterized by the following physical properties: viscosity of about 38 cPs as measured by a Ferranti-Shirley cone-plate viscometer at about 140° C. The $T_g$ and spectral strength of this material were not measured.

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]UNITHOX 750—C-50 linear alcohol ethoxylate available from Baker Petrolite of Tulsa, Okla.
[5]Desmodur I—Isophorone diisocyanate available from Bayer Corp. of Pittsburg, Pa.

EXAMPLE 16

The Reactant Product of Hydroabietic Alcohol, Octylphenol Ethoxylate, C-32 Linear Alcohol, C-50 Linear Alcohol Ethoxylate, Cyan Reactive Colorant, and Isophorone Diisocyanate To a 1000 ml four-neck resin kettle equipped with a Trubore stirrer, $N_2$ atmosphere, addition funnel (200 ml), and thermocouple-temperature controller was added about 31.0 grams (0.120 equiv.) of octylphenol ethoxylate[1], about 43.5 grams (0.120 equiv.) of hydroabietyl alcohol[2], about 52.0 grams (0.099 equiv.) of C-32 linear alcohol[3], about 114.9 grams (0.068 equiv.) of C-50 linear alcohol ethoxylate[4], and about 50.0 grams (0.450 equiv.) of isophorone diisocyanate[5] to the addition funnel. This mixture was heated to 120° C. and agitation begun when all components were molten (at approx. 100° C.). The isophorone diisocyanate was added in approximately 2 minutes. About 0.22 grams of dibutyltindilaurate[6] was added and the reaction mixture heated to about 150° C. After 2 hours at 150° C., about 11.5 grams (0.023 equiv.) of a hydroxyl containing cyan polymeric reactive colorant[7] was added and the reaction mixture heated at about 150° C. After 1 hours at 150° C., about 13.0 grams (0.025 equiv.) of C-32 linear alcohol[3] was added and the reaction mixture heated at about 150° C. for 1 hour. A FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a cyan solid resin at room temperature characterized by the following physical properties: viscosity of about 12.5 cPs as measured by a Ferranti-Shirley cone-plate viscometer at about 140° C. The $T_g$ and spectral strength of this material were not measured.

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]UNITHOX 750—C-50 linear alcohol ethoxylate available from Baker Petrolite of Tulsa, Okla
[5]Desmodur I—Isophorone diisocyanate available from Bayer Corp. of Pittsburg, Pa. [6]FASCAT 4202—dibutyltindilaurate available from Elf Atochem North America inc. of Philadelphia, Pa
[7]Experimental Blue III (9495–28) available from Milliken and Company of Spartanburg, S.C.

EXAMPLE 17

Reaction Product of Hydroabietic Alcohol, Octylphenol Ethoxylate, C-30 Linear Alcohol, and 0.2 Equivalents of C-50 Linear Alcohol Ethoxylate with Isophorone Diisocyanate To a 3000 ml four-neck resin kettle equipped with a Trubore stirrer, $N_2$ atmosphere, addition funnel and thermocouple-temperature controller was added about 243.0 grams (0.946 moles) of octylphenol ethoxylate[1], about 343.0 grams (0.947 moles) of hydroabietyl alcohol[2], about 497.0 grams (0.947 moles) of C-32 linear alcohol[3], about 536 grams (0.315 moles) of C-50 linear alcohol ethoxylate[4], and about 350.0 grams (1.577 moles) of isophorone diisocyanate[5] to the addition funnel. This mixture was heated to 120° C. and agitation begun when all components were molten (at approx. 100° C.). The isophorone diisocyanate was added in approximately 10 minutes. About 0.80 grams of dibutyltindilaurate[6] was added and the reaction mixture heated to about 150° C. After 2 hours at an FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^1$ corresponding to urethane frequencies was used to confirm this. The final mixed urethane resin product was then poured into aluminum molds and allowed to cool and harden. This final product was a clear solid resin at room temperature characterized by the following physical properties: viscosity of about 31 cPs as measured by a Ferranti-Shirley cone-plate viscometer at about 140° C. and a Tg of about 3° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
3UNILIN 425—C-32 linear alcohol available from Baker Petrolite of Tulsa, Okla.
[4]UNITHOX 750—C-50 linear alcohol ethoxylate available from Baker Petrolite of Tulsa, Okla.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 18

Reaction Product of Hydroabietic Alcohol, Octylphenol Ethoxylate, C-30 Linear Alcohol, and 0.1 Equivalents of C-50 Linear Alcohol Ethoxylate with Isophorone Diisocyanate To a 140 ml beaker equipped with teflon coated magnetic stir bar and placed in a silicone oil bath on a stirring hot plate was added about 7.3 grams (0.0284 moles) of octylphenol ethoxylate[1], about 10.1 grams (0.0285 equiv.) of hydroabietyl alcohol[2], about 15.0 grams (0.0286 moles) of C-32 linear alcohol[3], and about 7.7 grams (0.0045 moles) of C-50 linear alcohol ethoxylate[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 30.5 cPs as measured by a Ferranti-Shirley cone-plate viscometer at about 140° C., and a $T_g$ of about 2.8° C. as measured by Dynamic Mechanical Analysis using a Rheometrics Solids analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]UNITHOX 750—C-50 linear alcohol ethoxylate available from Baker Petrolite of Tulsa, Okla.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 19

Reaction Product of Hydroabietic Alcohol, Octylphenol Ethoxylate, C-30 Linear Alcohol, and 0.3 Equivalents of C-50 Linear Alcohol Ethoxylate with Isophorone Diisocyanate To a 140 ml beaker equipped with teflon coated magnetic stir bar and placed in a silicone oil bath on a stirring hot plate was added about 6.6 grams (0.0257 moles) of octylphenol ethoxylate[1], about 9.2 grams (0.0254 equiv.) of hydroabietyl alcohol[2], about 13.4 grams (0.0255 moles) of C-32 linear alcohol[3], and about 23.0 grams (0.0135 moles) of C-50 linear alcohol ethoxylate[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 cm$^{-1}$ (NCO) and the appearance (or increase in magnitude) of peaks at about 1740–1680 cm$^{-1}$ and about 1540–1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 29.8 cPs as measured by a Ferranti-Shirley cone-plate viscometer at about 140° C., and a $T_g$ of about 12.9° C. as measured by Dynamic Mechanical Analysis using a Rheometrics Solids Analyzer (RSAII).
[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]UNITHOX 750—C-50 linear alcohol ethoxylate available from Baker Petrolite of Tulsa, Okla.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 20

Reaction Product of Hydroabietic Alcohol, Octylphenol Ethoxylate, C-30 Linear Alcohol, and 0.4 Equivalents of C-50 Linear Alcohol Ethoxylate with Isophorone Diisocyanate To a 140 ml beaker equipped with teflon coated magnetic stir bar and placed in a silicone oil bath on a stirring hot plate was added about 6.2 grams (0.0241 moles) of octylphenol ethoxylate[1], about 8.7 grams (0.0240 equiv.) of hydroabietyl alcohol[2], about 12.6 grams (0.0240 moles) of C-32 linear alcohol[3], and about 30.6 grams (0.0180 moles) of C-50 linear alcohol ethoxylate[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this.

EXAMPLE 21

Reaction Product of Hydroabietyl Alcohols, Octylphenol Ethoxylate, C-30 Linear Alcohol, 2-Hexadecyleicosanol, and Yellow Reactive Colorant, with Isophorone Diisocyanate To a 1000 ml four-neck resin kettle equipped with a Trubore stirrer, $N_2$ atmosphere, addition funnel (200 ml), and thermocouple-temperature controller was added about 31.0 grams (0.120 equiv.) of octylphenol ethoxylate[1], about 43.5 grams (0.120 equiv.) of hydroabietyl alcohol[2], about 63.0 grams (0.120 equiv.) of C-32 linear alcohol[3], about 23.0 grams (0.045 equiv.) of 2-hexadecyleicosanol[4], about 15.7 grams (0.0225 equiv.) of a yellow polymeric colorant corresponding to Colorant A from Table I of U.S. Pat. No. 5,231,135, and about 50.0 grams (0.450 equiv.) of isophorone diisocyanate[5] to the addition funnel. This mixture was heated to 120° C. and agitation begun when all components were molten (at approx. 100° C.). The isophorone diisocyanate[6] was added in approximately 2 minutes. About 0.22 grams of dibutyltindilaurate[6] was added and the reaction mixture heated to about 150° C. After 2 hours at 150° C., about 4.0 grams (0.008 equiv.) of C-32 linear alcohol[3] was added and the reaction mixture heated at about 150° C. for 1 hour. A FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a yellow solid resin at room temperature characterized by the following physical properties: viscosity of about 32.1 cPs as measured by a Ferranti-Shirley coneplate viscometer at about 140° C. The $T_g$ and spectral strength of this material were not measured.
[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]ISOFOL 36—2-hexadecyleicosanol available from Vista Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 22

Reaction Product of Hydroabietyl Alcohol, Octylphenol Ethoxylate, C-30 Linear Alcohol, and 0.1 Equivalents of 2-Hexadecyleicosanol with Isophorone Diisocyanate To a 140 ml beaker equipped with teflon coated magnetic stir bar and placed in a silicone oil bath on a stirring hot plate was added about 7.3 grams (0.0284 moles) of octylphenol ethoxylate[1], about 10.1 grams (0.0285 equiv.) of hydroabietyl alcohol[2], about 15.0 grams (0.0286 moles) of C-32 linear alcohol[3], and about 2.3 grams (0.0045 moles) of 2-hexadecyleicosanol[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 30 cPs as measured by a Ferranti-Shirley cone-plate viscometer at about 140° C., a $T_g$ of about 17.3° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]ISOFOL 36—2-hexadecyleicosanol available from Vista Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 23

Reaction Product of Hydroabietyl Alcohol, Octylphenol Ethoxylate, C-30 Linear Alcohol, and 0.2 Equivalents of 2-Hexadecyleicosanol with Isophorone Diisocyanate To a 140 ml beaker equipped with teflon coated magnetic stir bar and placed in a silicone oil bath on a stirring hot plate was added about 7.0 grams (0.0272 moles) of octylphenol ethoxylate[1], about 9.6 grams (0.0271 equiv.) of hydroabietyl alcohol[2], about 14.2 grams (0.0270 moles) of C-32 linear alcohol[3], and about 4.6 grams (0.0090 moles) of 2-hexadecyleicosanol[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 27.7 cPs as measured by a Ferranti-Shirley cone-plate viscometer at about 140° C., a $T_g$ of about 7.9° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]ISOFOL 36—2-hexadecyleicosanol available from Vista Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 24

Reaction Product of Hydroabietyl Alcohol, Octylphenol Ethoxylate, C-30 Linear Alcohol, and 0.3 Equivalents of 2-Hexadecyleicosanol with Isophorone Diisocyanate To a 140 ml beaker equipped with teflon coated magnetic stir bar and placed in a silicone oil bath on a stirring hot plate was added about 6.6 grams (0.0257 moles) of octylphenol ethoxylate[1], about 9.0 grams (0.0254 equiv.) of hydroabietyl alcohol[2], about 13.4 grams (0.0255 moles) of C-32 linear alcohol[3], and about 6.9 grams (0.0135 moles) of 2-hexadecyleicosanol[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 26.4 cPs as measured by a Ferranti-Shirley cone-plate viscometer at about 140° C., a $T_g$ of about 7.1° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNELIN 425—C-32 linear alcohol available from Baker Petrolite of Tulsa, Okla.
[4]ISOFOL 36—2-hexadecyleicosanol available from Vista Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 25

Reaction Product of Hydroabietyl Alcohol, Octylphenol Ethoxylate, C-30 Linear Alcohol, and 0.4 Equivalents of 2-Hexadecyleicosanol with Isophorone Diisocyanate To a 140 ml beaker equipped with teflon coated magnetic stir bar and placed in a silicone oil bath on a stirring hot plate was added about 6.2 grams (0.0241 moles) of octylphenol ethoxylate[1], about 8.5 grams (0.0240 equiv.) of hydroabietyl alcohol[2], about 12.6 grams (0.0240 moles) of C-32 linear alcohol[3], and about 9.2 grams (0.0180 moles) of 2-hexadecyleicosanol[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final productced was a clear solid resin at room temperature characterized by the following physical properties: viscosity of about 25.0 cPs as measured by a Ferranti-Shirley cone-plate viscometer at about 140° C., a $T_g$ of about 6° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]ISOFOL 36—2-hexadecyleicosanol available from Vista Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 26

The Reaction Product of Abietyl Alcohol, Octylphenol Ethoxylate, C-30 Linear Alcohol, and 0.1 Equivalents of Poly(ethylene/butylene) monoalcohol with Isophorone Diisocyanate To a 140 ml beaker equipped with teflon coated magnetic stir bar and placed in a silicone oil bath on a stirring hot plate was added about 7.3 grams (0.0284 moles) of octylphenol ethoxylate[1], about 10.3 grams (0.0285 equiv.) of hydroabietyl alcohol[2], about 15.0 grams (0.0286 moles) of C-32 linear alcohol[3], and about 21.0 grams (0.0045 moles) of poly(ethylene/butylene) mono-ol[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 72 cPs as measured by a Ferranti-Shirley cone-plate viscometer at about 140° C., and a $T_g$ of about −47.6° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]KRATON Liquid L-1203 polymer—poly(ethylene/butylene) mono-ol available from Shell Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 27

The Reaction Product of Abietyl Alcohol, Octylphenol Ethoxylate, C-30 Linear Alcohol, and 0.2 Equivalents of Poly(ethylene/butylene) monoalcohol with Isophorone Diisocyanate To a 140 ml beaker equipped with teflon coated magnetic stir bar and placed in a silicone oil bath on a stirring hot plate was added about 7.0 grams (0.0272 moles) of octylphenol ethoxylate[1], about 9.8 grams (0.0271 equiv.) of hydroabietyl alcohol[2], about 14.2 grams (0.0270 moles) of C-32 linear alcohol[3], and about 42.0 grams (0.0090 moles) of poly(ethylene/butylene) mono-ol[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 17401680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 105 cPs as measured by a Ferranti-Shirley cone-plate viscometer at about 140° C. The $T_g$ of this example could not be measured because it was so soft as to the intractable.

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]KRATON Liquid L-1203 polymer—poly(ethylene/butylene) mono-ol available from Shell Chemical Company of Houston, Tex.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 28

The Reaction Product of Abietyl Alcohol, Octylphenol Ethoxylate, C-30 Linear Alcohol, and 0.1 Equivalents of Polyoxyethylene (2) Stearyl Ether with Isophorone Diisocyanate To a 140 ml beaker equipped with teflon coated magnetic stir bar and placed in a silicone oil bath on a stirring hot plate was added about 7.3 grams (0.0284 moles) of octylphenol ethoxylate[1], about 10.3 grams (0.0285 equiv.) of hydroabietyl alcohol[2], about 15.0 grams (0.0286 moles) of C-32 linear alcohol[3], and about 1.6 grams (0.0045 moles) of polyoxyethylene(2) stearylether[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 31.0 cPs as measured by a Ferranti-Shirley cone-plate viscometer at about 140° C., and a $T_g$ of about 19.9° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.

EXAMPLE 29

The Reaction Product of Abietyl Alcohol, Octylphenol Ethoxylate, C-30 Linear Alcohol, and 0.2 Equivalents of Polyoxyethylene (2) Stearyl Ether with Isophorone Diisocyanate To a 140 ml beaker equipped with teflon coated magnetic stir bar and placed in a silicone oil bath on a stirring hot plate was added about 7.0 grams (0.0272 moles) of octylphenol ethoxylate[1], about 9.8 grams (0.0271 equiv.) of hydroabietyl alcohol[2], about 14.2 grams (0.0270 moles) of C-32 linear alcohol[3], and about 3.2 grams (0.0090 moles) polyoxyethylene(2) stearyl ether[4]. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 28.4 cPs as measured by a Ferranti-Shirley cone-plate viscometer at about 140° C., and a $T_g$ of about 12.5° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]BRIJ 72—polyoxyethylene(2)stearyl ether available from ICI Americas Inc. of Wilmington, Del.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 30

The Reaction Product of Abietyl Alcohol, Octylphenol Ethoxylate, C-30 Linear Alcohol, and 0.3 Equivalents of Polyoxyethylene (2) Stearyl Ether with Isophorone Diisocyanate To a 140 ml beaker equipped with teflon coated magnetic stir bar and placed in a silicone oil bath on a stirring hot plate was added about 6.6 grams (0.0257 moles) of octylphenol ethoxylate[1], about 9.2 grams (0.0254 equiv.) of hydroabietyl alcohol[2], about 13.4 grams (0.0255 moles) of C-32 linear alcohol[3], and about 4.8 grams (0.0135 moles) of polyoxyethylene(2)stearyl ether 4. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 $cm^{-1}$ (NCO) and the appearance (or increase in magnitude) of peaks at about 1740 to about 1680 $cm^{-1}$ and about 1540 to about 1530 $cm^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 26.0 cPs as measured by a Ferranti-Shirley cone-plate viscometer at about 140° C., and a $T_g$ of about 4.2° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]BRIJ 72—polyoxyethylene(2)stearyl ether available from ICI Americas Inc. of Wilmington, Del.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 31

The Reaction Product of Abietyl Alcohol, Octylphenol Ethoxylate, C-30 Linear Alcohol, and 0.4 Equivalents of Polyoxyethylene (2) Stearyl Ether with Isophorone Diisocyanate To a 140 ml beaker equipped with teflon coated magnetic stir bar and placed in a silicone oil bath on a stirring hot plate was added about 6.2 grams (0.0241 moles) of octylphenol ethoxylate[1], about 8.7 grams (0.0240 equiv.) of hydroabietyl alcohol[2], about 12.6 grams (0.0240 moles) of C-32 linear alcohol[3], and about 6.5 grams (0.0180 moles) of polyoxyethylene(2) stearyl ether 4. This mixture was heated to 120° C. and agitation begun when all components were molten (at approx. 100° C.). About 10.0 grams (0.045 moles) of isophorone diisocyanate[5] and about 0.05 grams of dibutyltindilaurate[6] were added and the reaction mixture heated to about 150° C. After 2 hours at 150° C., a FT-IR of the reaction product was run to insure all of the NCO functionality was consumed. The absence (disappearance) of a peak at about 2285 cm$^{-1}$ (NCO) and the appearance (or increase in magnitude) of peaks at about 1740 to about 1680 cm$^{-1}$ and about 1540 to about 1530 cm$^{-1}$ corresponding to urethane frequencies was used to confirm this. The final mixed urethane resin product was then poured into aluminum molds and allowed to cool and harden. This final product was a clear solid resin at room temperature characterized by the following physical properties: viscosity of about 24.9 cPs as measured by a Ferranti-Shirley cone-plate viscometer at about 140° C., and a T$_g$ of about 7.6° C. as measured by Dynamic Mechanical Analysis using a Rheometrics Solids Analyzer (RSAII).

[1]IGEPAL CA-210—octylphenol ethoxylate, available from Rhone-Poulenc Co., Cranbury, N.J. Note: Triton X15 octylphenol ethoxylate available from Union Carbide Chemicals and Plastics Company Inc. of Danbury, Conn. can be directly substituted for IGEPAL CA-210 in this reaction.
[2]Abitol E—Hydroabietyl alcohol available from Hercules Inc. of Wilmington, Del.
[3]UNILIN 425—C-32 linear alcohol available from Baker Petrolite of Tulsa, Okla.
[4]BRIJ 72—polyoxyethylene(2)stearyl ether available from ICI Americas Inc. of Wilmington, Del.
[5]Desmodur I—Isophorone diisocyanate available from Bayer Corp. of Pittsburg, Pa.
[6]FASCAT 4202—dibutyltindilaurate available from Elf Atochem North America inc. of Philadelphia, Pa.

EXAMPLE 32

Yellow Polyethylene Wax-Based Ink

In a stainless steel beaker were combined 100 grams of the material from Example 1, 100 grams of the material from Example 2 and 292 grams of Polywax PE850[1]. The materials were melted overnight at 125° C., then blended by stirring in a temperature controlled mantle for 1 hr at 125° C. The ink was then filtered through a heated (125° C.) Mott apparatus (available from Mott Mettalurgical) using a 2μ filter at 5 psi. The filtered polyethylene-based ink was poured into molds and allowed to solidify to form ink sticks. This final yellow ink product was characterized by the following physical properties: viscosity of about 13.5 cPs at 140° C. as measured by a Ferranti-Shirley cone-plate viscometer, a melting point of about 105° C. as measured by differential scanning calorimetry using a DuPont 2100 calorimeter and a Tg of about 20° C. as measured by Dynamic Mechanical Analysis using a Rheometrics Solids Analyzer (RSAII). The spectral strength of this ink was not measured. This ink was placed in a lab prototype Phaser® 340 printer which uses an offset transfer printing process. The ink was printed using a print head temperature of 155° C., a drum temperature of 85° C. and a paper preheat temperature of 114° C. The finished prints were found to have a coefficient of friction against glass of about 0.6 as measured by a Thwing-Albert Friction/Peel Tester (Model 225-1). The finished prints were also found to feed reliably in several different office photocopy machines including models. However, the durability of the finished prints was poor as evidenced by excessive flaking of ink when the prints were folded and a poor resistance to damage from scratching.

[1]Polywax PE850—Polyethylene wax available from Baker Petrolite Co. of Tulsa, Okla.

EXAMPLE 33

Yellow Hybrid Ink Formed From Physical Mixture of Polyethylene Based Ink and Amide Wax Based Ink In a stainless steel beaker were combined 74 grams of the ink from Example 12 of U.S. patent application Ser. No. 08/672,617 now U.S. Pat. No. 5,780,528 (issued Jul. 14, 1998; and 90 grams of the ink from Example 32 above. The inks were melted for 3 hours at 125° C., then blended by stirring in a temperature controlled mantle for ½ hr at 125° C. The ink was then filtered through a heated (125° C.) Mott apparatus (available from Mott Mettalurgical) using a 2μ filter at 5 psi. The filtered ink mixture was poured into molds and allowed to solidify to form ink sticks.

EXAMPLE 34

Cyan Hybrid Ink Made From a Mixture of Urethane Resins and a Mixture of Waxes In a stainless steel beaker were combined 248 grams of the cyan colored urethane resin from Example 2 of co-pending U.S. patent application Ser. No. 08/672,617 now U.S. Pat. No. 5,780,528 (issued Jul. 14, 1998); 124 grams of the urethane resin from Example 1, 124 grams of the urethane/urea resin from Example 4 of the same U.S. patent application Ser. No. 08/672,617, now U.S. Pat. No. 5,780,528 (issued Jul. 14, 1998) 230 grams of Witco S-180 stearyl stearamide wax[1], and 275 grams of Polywax PE850[2]. The materials were melted for 2 hours at 125° C., then blended by stirring in a temperature controlled mantle for 2 hours at 125° C. The ink was then filtered through a heated (125° C.) Mott apparatus (available from Mott Mettalurgical) using a 2μ filter at 5psi. The hybrid ink was poured into molds and allowed to solidify to form ink sticks. This final yellow ink product was characterized by the following physical properties: viscosity of about 12.2 cPs at 140° C. as measured by a Ferranti-Shirley cone-plate viscometer, two melting points at about 91° C. and about 105° C. as measured by differential scanning calorimetry using a DuPont 2100 calorimeter and a Tg of about 21 ° C. as measured by Dynamic Mechanical Analysis using a Rheometrics Solids Analyzer (RSAII). The spectral strength of this ink was not measured. This ink was placed in a Phaser® 340 printer which uses an offset transfer printing process. The ink was printed using a print head temperature of 140° C., a drum temperature of 64° C. and a paper preheat temperature of 61° C. The finished prints were found to have a coefficient of friction against glass that varied from about 0.6–1.8 as measured by a Thwing-Albert Friction/Peel Tester (Model 225-1). Their performance in photocopiers was comparable to the prints from Example 33 above. The finished prints were also found to have a resistance to flaking of the ink when folded very similar to the prints made from the ink in Example 33 and good scratch resistance.

[1]Polywax PE850—Polyethylene wax available from Baker Petrolite Co. of Tulsa, Okla.
[2]Kemamide S-180—Stearyl Stearamide available from Witco Chemical Company of Memphis, Tenn.

EXAMPLE 35

Yellow Hybrid Ink Made From a One-Pot Colored Resin Synthesis

In a stainless steel beaker were combined 420 grams of the molten yellow colored reaction mixture from Example 6, and 150 grams of molten Polywax PE850[1](S-180 amide wax[2] was already in the yellow reaction mixture since it was used as a solvent for the reaction). The materials were blended by stirring in a temperature controlled mantle for ½ hour at 125° C. The ink was then filtered through a heated (125° C.) Mott apparatus (available from Mott Mettalurgical) using a 2μ filter at 5 psi. The filtered hybrid ink was poured into molds and allowed to solidify to form ink sticks. This final yellow ink product was characterized by the following physical properties: viscosity of about 12.0 cPs at 140° C. as measured by a Ferranti-Shirley cone-plate viscometer, two melting points at about 91° C. and about 105° C. as measured by differential scanning calorimetry using a DuPont 2100 calorimeter and a Tg of about 20° C. as measured by Dynamic Mechanical Analysis using a Rheometrics Solids Analyzer (RSAII). The spectral strength of this ink was not measured. This ink was placed in a Phaser® 340 printer which uses an offset transfer printing process. The ink was printed using a print head temperature of 140° C., a drum temperature of 60° C. and a paper preheat temperature of 60° C. The finished prints were found to have a coefficient of friction against glass that varied from about 0.5–1.8 as measured by a Thwing-Albert Friction/Peel Tester (Model 225-1). Their performance in photocopiers was comparable to the prints from Example 33 above. The finished prints were also found to have excellent resistance to flaking of the ink when folded and good scratch resistance.

[1]Polywax PE850—Polyethylene wax available from Baker Petrolite Co. of Tulsa, Okla.
[2]Kemamide S-180—Stearyl Stearamide available from Witco Chemical Company of Memphis, Tenn.

EXAMPLE 36

Cyan Polycarbonate-Modified Hybrid Ink Made From a One-Pot Resin Synthesis and Powdered Cyan Dye In a stainless steel beaker were combined 225 grams of the clear reaction mixture from Example 11, 169 grams of Witco S-180 stearyl stearamide[1] and 106 grams of Polywax PE850[2]. The materials were melted together at a temperature of about 135° C. in an oven, then blended by stirring in a temperature controlled mantle for ½ hr. at 125° C. To the clear ink base was added 11.0 grams of Solvent Blue 44, and the resulting mixture was stirred at 125° C. for an additional 2 hours. The ink was then filtered through a heated (125° C.) Mott apparatus (available from Mott Mettalurgical) using a 2μ filter at 5 psi. The filtered modified hybrid ink was poured into molds and allowed to solidify to form ink sticks. This final cyan ink product was characterized by the following physical properties: viscosity of about 13.1 cPs at 140° C. as measured by a Ferranti-Shirley cone-plate viscometer, two melting points at about 88° C. and about 100° C. as measured by differential scanning calorimetry using a DuPont 2100 calorimeter and a Tg of about 33° C. as measured by Dynamic Mechanical Analysis using a Rheometrics Solids Analyzer (RSAII). The spectral strength of this ink was not measured. This ink was placed in a Phaser® 340 printer which uses an offset transfer printing process. The ink was printed using a print head temperature of 140° C., a drum temperature of 60° C. and a paper preheat temperature of 60° C. The finished prints were found to have a coefficient of friction against glass that varied from about 0.6–2.0 as measured by a Thwing-Albert Friction/Peel Tester (Model 225-1). Their performance in photocopiers was comparable to the prints from Example 33 above. The finished prints were also found to have excellent resistance to flaking of the ink when folded and very good scratch resistance.

[1]Kemamide S-180—Stearyl Stearamide available from Witco Chemical Company of Memphis, Tenn.
[2]Polywax PE850—Polyethylene wax available from Baker Petrolite Co. of Tulsa, Okla.

EXAMPLE 37

Yellow Polycarbonate-Modified Hybrid Ink Made From a One-Pot Polycarbonate-Modified Colored Resin In a stainless steel beaker were combined 225 grams of the yellow reaction mixture from Example 8, 137.5 grams of Witco S-180 stearyl stearamide[1] and 137.5 grams of molten Polywax PE850[2]. The materials were melted together at a temperature of about 135° C. in an oven, then blended by stirring in a temperature controlled mantle for 1 hr. at 125° C. The ink was then filtered through a heated (125° C.) Mott apparatus (available from Mott Mettalurgical) using a 2μ filter at 5 psi. The filtered modified hybrid ink was poured into molds and allowed to solidify to form ink sticks. This final yellow ink product was characterized by the following physical properties: viscosity of about 13.1 cPs at 140° C. as measured by a Ferranti-Shirley cone-plate viscometer, two melting points at about 88° C. and about 100° C. as measured by differential scanning calorimetry using a DuPont 2100 calorimeter and two Tgs of about 2° C. and about 30° C. as measured by Dynamic Mechanical Analysis using a Rheometrics Solids Analyzer (RSAII). The spectral strength of this ink was not measured. This ink was placed in a Phaser® 340 printer which uses an offset transfer printing process. The ink was printed using a print head temperature of 140° C., a drum temperature of 62.5° C. and a paper preheat temperature of 60° C. The finished prints were found to have a coefficient of friction against glass that varied from about 0.5–1.1 as measured by a Thwing-Albert Friction/Peel Tester (Model 225-1). Their performance in photocopiers was comparable to the prints from Example 33 above. The finished prints were also found to have excellent resistance to flaking of the ink when folded and very good scratch resistance.

[1]Kemamide S-180—Stearyl Stearamide available from Witco Chemical Company of Memphis, Tenn.
[2]Polywax PE850—Polyethylene wax available from Baker Petrolite Co. of Tulsa, Okla.

EXAMPLE 38

Cyan "Unithox"-Modified Hybrid Ink Made From a One-Pot "Unithox"-Modified Colored Resin In a stainless steel beaker were combined 250 grams of the cyan reaction mixture from Example 15, 153 grams of Witco S-180 stearyl stearamide[1] and 153 grams of Polywax PE850[2]. The materials were melted together at a temperature of about 120° C. in an oven, then blended by stirring in a temperature controlled mantle for 1 hr. at 125° C. The ink was then filtered through a heated (125° C.) Mott apparatus (available from Mott Mettalurgical) using a 2μ filter at 5 psi. The filtered modified hybrid ink was poured into molds and allowed to solidify to form ink sticks. This final cyan ink product was characterized by the following physical properties: viscosity of about 11.1 cPs at 140° C. as measured by a Ferranti-Shirley cone-plate viscometer, two melting points of about 88° C. and about 100° C. as measured by differential scanning calorimetry using a DuPont 2100 calorimeter and a Tg of about 33° C. as measured by Dynamic Mechanical Analysis using a Rheometrics Solids Analyzer (RSAII). The spectral strength of this ink was not measured. This ink was placed in a Phaser® 340 printer which uses an offset transfer printing process. The ink was printed using a print head temperature of 140° C., a drum temperature of 65° C. and a paper preheat temperature of 60° C. The coefficient of friction of the finished prints was not measured. However, their performance in photocopiers was comparable to the prints from Example 33 above. The finished prints were also found to have good resistance to flaking of the ink when folded and very good scratch resistance.

[1]Kemamide S-180—Stearyl Stearamide available from Witco Chemical Company of Memphis, Tenn.
[2] Polywax PE850—Polyethylene wax available from Baker Petrolite Co. of Tulsa, Okla.

EXAMPLE 39

Yellow "Isofol"-Modified Hybrid Ink Made From a One-Pot "Isofol"-Modified Colored Resin In a stainless steel beaker were combined 200 grams of the yellow reaction mixture from Example 21, 122 grams of Witco S-180 stearyl stearamide[1] and 122 grams of Polywax PE850[2]. The materials were melted together at a temperature of about 120° C. in an oven, then blended by stirring in a temperature controlled mantle for 2 hr. at 125° C. The ink was then filtered through a heated (125° C.) Mott apparatus (available from Mott Mettalurgical) using a 2μ filter at 5 psi. The filtered modified hybrid ink was poured into molds and allowed to solidify to form ink sticks. This final yellow ink product was characterized by the following physical properties: viscosity of about 10.8 cPs at 140° C. as measured by a Ferranti-Shirley cone-plate viscometer, two melting points of about 88° C. and about 100° C. as measured by differential scanning calorimetry using a DuPont 2100 calorimeter and a Tg of about 4.1° C. as measured by Dynamic Mechanical Analysis using a Rheometrics Solids Analyzer (RSAII). The spectral strength of this ink was not measured. This ink was placed in a Phaser® 340 printer which uses an offset transfer printing process. The ink was printed using a print head temperature of 140° C., a drum temperature of 60° C. and a paper preheat temperature of 60° C. The coefficient of friction of the finished prints was not measured. However, their performance in photocopiers was comparable to the prints from Example 33 above. The finished prints were also found to have good resistance to flaking of the ink when folded and very good scratch resistance.

[1] Kemamide S-180—Stearyl Stearamide available from Witco Chemical Company of Memphis, Tenn.
[2] Polywax PE850—Polyethylene wax available from Baker Petrolite Co. of Tulsa, Okla.

The phase change ink composition of the present invention can have a percentage composition of about 0% to about 75% by weight colored resin, about 0% to about 75% by weight colorless resin, and about 25% to about 75% by weight combined waxes. A more preferred range is about 0% to about 50% by weight colored resin, about 0% to about 50% by weight colorless resin, and about 25% to about 75% by weight combined waxes. A most preferred range is about 0% to about 40% by weight colored resin, about 0% to about 40% by weight colorless resin, and about 40% to about 60% by weight combined waxes.

While the invention has been described above with reference to specific embodiments thereof, it is apparent that many changes, modifications and variations can be made without departing from the inventive concept disclosed herein. For example, it should be noted where a urethane reaction product is obtained, a single alcohol precursor or multiple alcohol precursors may be used with an appropriate isocyanate as long as the required stoichiometric ratio is maintained. Where a urethane/urea reaction product is obtained, single or multiple alcohol and amine precursors may be employed within the appropriate stoichiometric ratios. It should also be noted that while specific hydroxyl containing toughening agents have been described, other suitable hydroxyl containing toughening agents, such as hydroxyl containing poly-butylene oxide, can equally well be employed. Additionally, the toughening agent can be blended with the urethane resin reaction products. These toughening agents can be commercial plasticizers, that include, for example, phthalate ester, aryl phosphate, polyisobutylene and the like plasticizers. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink composition comprising a urethane resin that is the reaction product of a plurality of alcohols, a chromogen containing nucleophile, and an isocyanate, the alcohols comprising straight chained monohydric aliphatic alcohols of carbon chain length 20 or higher, monohydric aromatic alkoxylated alcohols, or mixtures of straight chained monohydric aliphatic alcohols of carbon chain length 20 of higher with monohydric aromatic alkoxylated alcohols.

2. The phase change ink of claim 1 further comprising a mono-amide and a polyethylene wax.

3. A phase change ink composition comprising:
(a) a urethane resin that is the reaction product of a plurality of alcohols, a chromogen containing nucleophile, and an isocyanate, the alcohols comprising straight chained monohydric aliphatic alcohols of carbon chain length 20 or higher monohydric aromatic alkoxylated alcohols, or mixtures of straight chained monohydric alipatic alcohols of carbon chain length 20 or higher with monohydric aromatic alkoxylated alcohols; and
(b) a toughening agent.

4. The phase change ink of claim 3 further comprising wherein the toughening agent is a hydroxyl containing compound.

5. The phase change ink of claim 3 wherein the toughening agent is one selected from the group consisting of a hydroxyl containing polycarbonate, a straight chained alcohol ethoxylate, a Guerbet-type branched alcohol, a polyethylene butylene mono-alcohol and mixtures thereof.

6. The phase change ink of claim 2 further comprising a carrier that includes a mono-amide and a polyethylene wax.

7. A phase change ink composition comprising a urethane material that is the reaction product of at least one alcohol and an isocyanate, the alcohol being a straight chained monohydric aliphatic alcohol of carbon chain length 20 or higher.

8. The phase change ink composition of claim 7 further comprising a polyethylene wax.

9. The phase change ink composition of claim 7 further comprising a colorant.

10. The phase change ink composition of claim 9 wherein the colorant is a dye, colored resin, or pigment.

11. The phase change ink composition of claim 7 further comprising at least one anti-oxidant.

12. The phase change ink composition of claim 7 wherein the isocyanate is selected from the group consisting of a monoisocyanate, a diisocyanate, a triisocyanate, a copolymer of a diisocyanate, and a copolymer of a triisocyanate.

13. The phase change ink composition of claim 7 wherein the isocyanate is isophorone diisocyanate.

14. A phase change ink composition comprising a urethane resin that is the reaction product of a plurality of alcohols, a chromogen containing nucleophile, and an isocyanate; the alcohols comprising a straight chained monohydric aliphatic alcohol of carbon chain length 20 or higher.

15. The phase change ink composition of claim 14 further comprising a toughening agent.

16. The phase change ink composition of claim 14 further comprising a toughening agent, a mono-amide and a polyethylene wax.

17. A phase change ink composition comprising a urethane resin that is the reaction product of a plurality of alcohols, a chromogen containing nucleophile, and an isocyanate; the alcohols comprising a monohydric aromatic alkoxylated alcohol.

18. The phase change ink composition of claim 17 further comprising a toughening agent.

19. The phase change ink composition of claim 17 further comprising a toughening agent, a mono-amide and a polyethylene wax.

* * * * *